United States Patent [19]

Hamm et al.

[11] 3,983,630

[45] Oct. 5, 1976

[54] NAVIGATIONAL CHARTING AND CALCULATING DEVICE

[75] Inventors: Alton B. Hamm, Fort Worth; Grover C. Ratliff, Jr., Hurst, both of Tex.

[73] Assignee: Hamm Systems, Fort Worth, Tex.

[22] Filed: Sept. 3, 1974

[21] Appl. No.: 502,416

Related U.S. Application Data

[63] Continuation-in-part of Ser. No. 454,451, March 25, 1974, abandoned.

[52] U.S. Cl. .................................. 33/1 SD; 33/78; 33/80
[51] Int. Cl.² ........................................ G01C 21/20
[58] Field of Search ............. 33/1 SD, 76 VA, 76 R, 33/78, 356, 80

[56] References Cited
UNITED STATES PATENTS

| | | | |
|---|---|---|---|
| 383,945 | 6/1888 | Fleming et al. | 33/80 |
| 1,395,200 | 10/1921 | Moore | 33/78 |
| 1,522,328 | 1/1925 | Rogers | 33/80 |
| 2,393,228 | 1/1946 | Blitz | 33/76 R |
| 2,415,277 | 2/1947 | Caston | 33/80 |
| 2,618,856 | 11/1952 | Sweet | 33/1 SD |
| 2,713,723 | 7/1955 | Anderson | 33/78 |
| 3,262,209 | 7/1966 | Saponaro et al. | 33/1 C |
| 3,387,372 | 6/1968 | Sabadishin | 33/76 |
| 3,456,352 | 7/1969 | Bowen | 33/76 |
| 3,827,150 | 8/1974 | Kubota | 33/1 SD |
| 3,844,041 | 10/1974 | Wilson | 33/1 SD |

FOREIGN PATENTS OR APPLICATIONS

| | | | |
|---|---|---|---|
| 1,047,729 | 12/1953 | France | 33/78 |
| 123,886 | 1/1949 | Sweden | 33/1 SD |
| 93,227 | 11/1938 | Sweden | 33/1 SD |
| 474,269 | 10/1937 | United Kingdom | 33/1 SD |

Primary Examiner—Richard E. Aegerter
Assistant Examiner—John W. Shepperd
Attorney, Agent, or Firm—Wofford, Felsman, Fails & Zobal

[57] ABSTRACT

The specification discloses a navigational charting and calculating device comprising a base plate having a circular recess in its top side for rotatably supporting a disc therein. The disc comprises a transparent circular member having a top marking surface, and a circular base adapted to removably support the transparent circular member for holding and securing a map therebetween. The peripheral edge of the transparent circular member is graduated in degrees from 0° to 360°. Sliding means having at least one straight edge is supported above the disc for sliding movement across the disc in a direction perpendicular to the length of its straight edge. The straight edge has equally spaced marks along its length representative of distance. In use, the disc is rotated to align the desired direction of travel in degrees with a reference point provided on the base plate and distance of travel in the desired direction is charted with the aid of the straight edge. At any location along the path of travel, the distance and direction back to the initial starting point, or other destination, may be determined by proper alignment of the present charted point and the desired destination on the disc with the straight edge.

10 Claims, 10 Drawing Figures

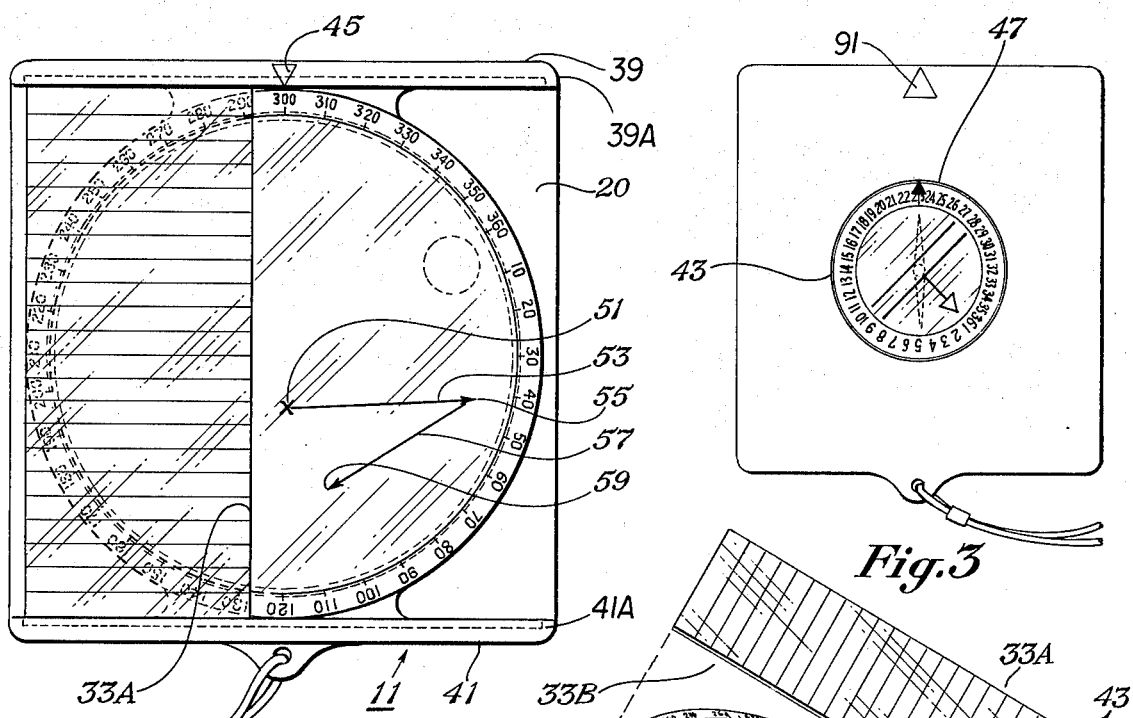
Fig.1
Fig.3
Fig.4
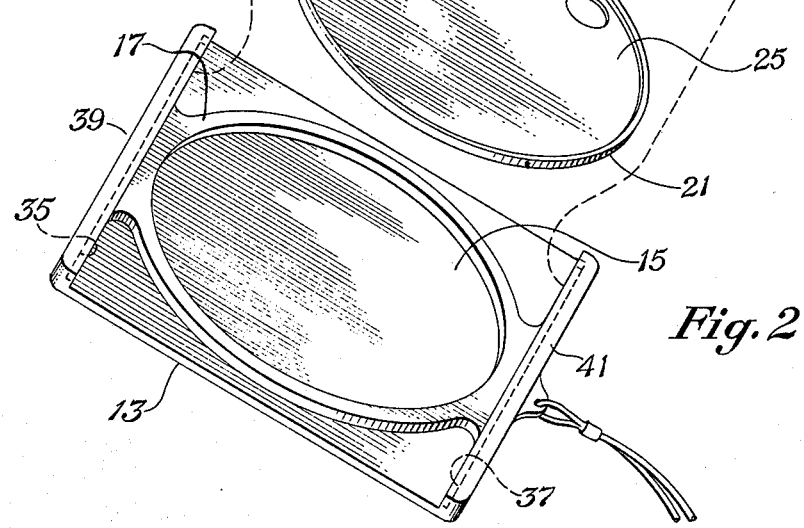
Fig.2

NAVIGATIONAL CHARTING AND CALCULATING DEVICE

This application is a continuation-in-part of U.S. Patent application Ser. No. 454,451, filed Mar. 25, 1974 now abandoned.

BACKGROUND OF THE INVENTION

This invention relates to a charting and calculating device to allow one to chart the course of travel and to determine the distance and direction back to the initial starting point or other destination. The device is particularly useful for persons on foot although it may be used for example, with small boats, land vehicles, or with aircraft.

SUMMARY OF THE INVENTION

The charting and calculating device comprises a base plate means; disc means comprising circular structure having an upper surface adapted to be marked upon; and means for rotatably mounting the disc means on one side of the base plate means. The circular structure is transparent and is adapted to have a map located on its underside for rotation therewith and for viewing from above through the transparent circular structure. In addition, the disc means has its peripheral edge graduated in degrees from 0° to 360° for alignment with a reference mark formed on the base plate means upon rotation of the disc means. Also provided is a sliding means having a straight edge marking guide supported above the disc means for sliding movement across the disc means in a direction perpendicular to the length of the straight edge. The straight edge has equally spaced marks along its length representative of distance.

In a further aspect, the base plate means has a circular recess in its top side adapted to receive the disc means for rotation therein. The base plate means has two parallel guides located on opposite sides of the circular recess for supporting the sliding means for sliding movement across the disc means. In the preferred embodiment, the disc means comprises a flat, transparent, circular member and a flat circular base adapted to support the transparent circular member for holding and securing a map between the transparent circular member and the circular base.

In a further embodiment, there is provided a magnetic compass adjustably secured to the back side of the base plate and which may be adjusted to correct for magnetic declination in the area in which the device is to be used whereby navigation may be carried out with respect to true north rather than magnetic north. In addition, there is provided a cord attached to one end of the device to allow a person to carry the device around his neck. A quick disconnect fastener is provided which allows the lower end of the device to be secured to one's clothing to prevent the device from swinging while walking.

BRIEF DESCRIPTION OF THE DRAWINGS

FIG. 1 illustrates a front view of the charting and calculating device of the present invention;

FIG. 2 is an exploded view of the device of FIG. 1;

FIG. 3 is a rear view of the device of FIG. 1;

FIG. 4 is a modified component which may be employed in the device of FIG. 1;

DETAILED DESCRIPTION OF THE INVENTION

Figure 5:
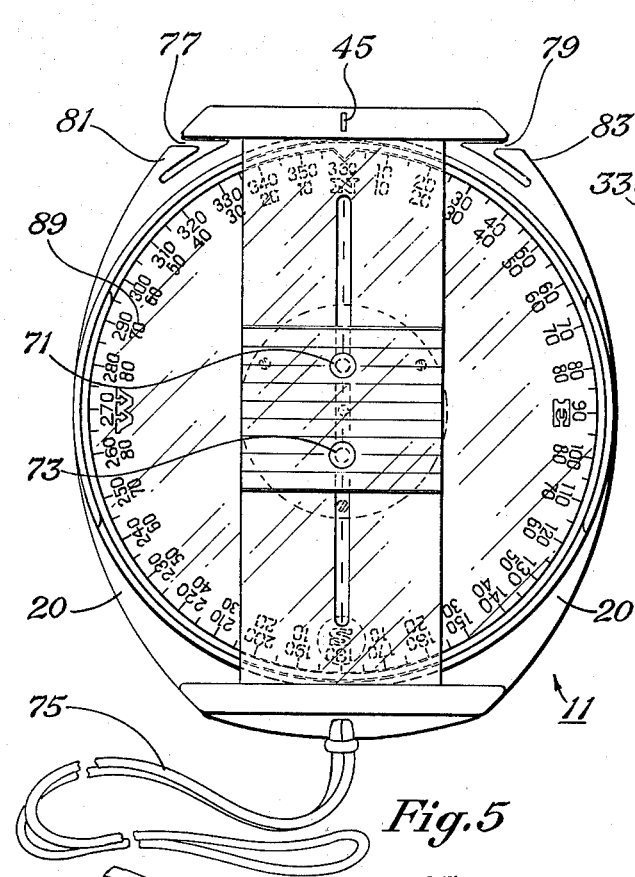
FIG. 5 is a modified charting and calculating device of the present invention.
Figure 7:
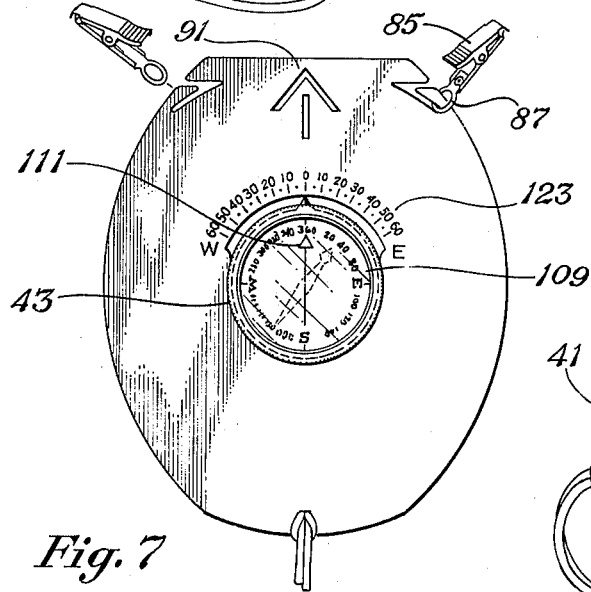
FIG. 7 is a rear view of the device of FIG. 5.
Figure 8:
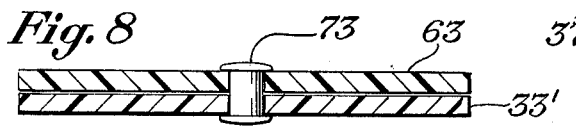
FIG. 8 is a cross sectional view of the sliding member of FIG. 5.

Referring now to FIGS. 1-3, the charting and calculating device is identified by reference numeral 11 and comprises a base plate 13 having a circular recess 15 formed by circular structure 17 for supporting a disc 20 for rotation therein. The disc 20 comprises a circular base 21 having a flange 23 forming a cavity or recess 25 for removably supporting a transparent circular member 27 in its recess. In use, a map 29 of the area to be traversed will be located between the top surface of the circular base 21 and the underside of the transparent member 27 when member 27 is inserted in place in the recess 25. When the disc 20 comprising the base 21 and its transparent member 27 with a map 29 sandwiched in between is located within the recess 15 of the base 13, the members 21 and 27, including the map 29, will be held or secured together relative to each other such that they will all rotate together in the recess 15 by turning the top surface of member 27.

When the disc 20 is located in the recess 15, the top surface of transparent member 27 will be flush with the top surface of the circular structure 17. Member 27 is formed of a material such as milar or other suitable material whereby its top surface may be marked or written upon, for example, with pencil or with certain types of ink. The marks may be erased when desired. Formed around the outer peripheral edge of the member 27 are degree marks 31 such that its peripheral edge is graduated in degrees from 0° to 360°.

Also provided is a sliding member 33 having parallel straight edges 33A and 33B which are employed as marking guides. The member 33 is removably supported for sliding movement above the recess 15 and hence above the disc 20 and holds the disc 20 in place in its recess 15. Slots 35 and 37 are formed in members 39 and 41 on opposite sides of the recess 15 for supporting the member 33 for sliding movement above and across the disc 20 in a direction perpendicular to the length of its straight edges 33A and 33B. Edge portions 39A and 41A act as stops to prevent the member 33 from sliding off of the base plate 13. Equally spaced scale lines 43 are formed along the length of the member 33 and which are representative of distance. For example, the space between adjacent lines 43 may be calibrated to represent 500 feet. Also formed on the top front face of the base 13 is a reference point 45. On the back of the base 13 is secured a compass 47 for finding magnetic north.

As mentioned above, the charting and calculating device 11 may be used with a person on foot or with small boats or land vehicles. For use by a person on foot, preferably, it will be employed with a device for accurately measuring the distance walked such as that disclosed in co-pending application Ser. No. 454,478, filed Mar. 25, 1974 and which is a continuation-in-part of U.S. application Ser. No. 291,776, filed Sept. 25, 1972. One of the devices of the continuation-in-part application has a digital readout such that the number of feet walked can be accurately and readily determined and then employed in conjunction with the charting and calculating device 11 to chart the distance and path of travel and to allow one to determine the direction and distance back to the initial starting point. For example, at a given position on the ground, one may find the corresponding point on the map 29 and place an "X" at that position on the top of the transparent member 27. In FIG. 1, the X is identified by reference numeral 51. Next assume that one desires to travel 30° east of magnetic north and one proceeds to travel in this direction for 4,000 feet. The direction of travel is determined from compass 47 while the distance of travel may be determined from the distance measuring device described and claimed in the above continuation-in-part application. The path of travel is charted on the device 11 by rotating the disc 20 to a position to align the 30° mark on the outer peripheral edge with the reference point 45. Having done this, the member 33 is moved or slid to align one of its edges 33A or 33B with the initial starting point 51 and then a line is drawn along the edge of the member 33 from the starting point 51 a distance corresponding with 4,000 feet as read from the scales 43. This line is identified by reference numeral 53. The new position on the device is identified by reference numeral 55. In charting a path of travel on the top surface of member 27, the line is always drawn along the edge of member 33 toward the edge of the base 13 on which the reference point 45 is found. Assume that the person on foot then desires to travel due south, or 180° from magnetic north, and he travels a distance of 3,464 feet. This path of travel is charted on the top surface of member 27 by rotating the disc 20 until the 180° mark is aligned with reference point 45. The member 33 is then moved to align one of its straight edges with the point 55. The path of travel 180° from magnetic north then is charted on the top surface of member 27 from the point 55 for a distance corresponding with 3,464 feet. This path of travel is identified by line 57 on the device and the proper distance is obtained by use of the scales 43. The new position on the device is identified by reference numeral 59. At this point, it may be desirable to determine the direction and distance back to the initial starting point 51. This is accomplished by rotating the disc 20 and moving member 33 to align the initial starting point 51 and the present point 59 with one of the straight edges of the member 33 such that the initial point 51 will be located between the present point 57 and the top end of the device which is designated as the end having the reference mark 45. Having done this, the direction back to the initial starting point 51 can be read from the degree mark which is in alignment with the reference point 45. In this instance, the direction back to the initial starting point is 270° or in a direction due west of point 59. The distance back to the initial starting point can be read from the scales 43 of the member 33. The above example is merely a simple description of the manner of use of the present device and it is to be understood that any type of complicated path of travel may be charted upon the top surface of the member 27 and the distance and direction back to the initial starting point or to any other desired destination may be easily determined by the procedure mentioned above.

Member 33 is a flexible transparent member. It may be removed from slots 35 and 37 by bending its center outward. At any point of travel, a new map may be readily inserted between the top member 27 and the circular base 21 of the disc by removing member 33 and the disc 20. The top member 27 may then be removed from cavity 25 to allow the old map to be replaced with a new map. Since the map is sandwiched in between top member 27 and the circular disc 21, the map is readily protected from water or moisture due to rain, etc.

FIG. 4 illustrates a modified sliding marking guide. It comprises a flexible transparent member 33' adapted to be supported for sliding movement in slots 35 and 37. Member 33' does not have the scale marks 43 along its parallel edge 33a and 33b, but supports a transparent guide 63, for sliding movement along the length of its edges 33a and 33b. Guide 63 has parallel straight edges 63a and 63b which are employed as marking guides. Formed along the length of the edges 63a and 63b are equally spaced marks 65 representative of distance. Since guide 63 may be slid along member 33', more accurate alignment of the scale marks 65 with the points charted on the surface of member 27 may be obtained.

Referring now to FIGS. 5–9, there will be described a modified charting and calculating device of the present invention. In this embodiment, like reference numerals identify like components of the embodiment of FIGS. 1–4. As illustrated in FIGS. 5–9, the charting and calculating device 11 comprises a base plate 13 having a circular recess 15 formed by circular structure or wall 17 for supporting a disc 20 for rotation therein. The base plate 13 is rounder than that of the embodiment of FIGS. 1–4. The wall 17 comprises lower portions 17A having two upward extensions 17B located on opposite sides of the center thereof. The disc 20 comprises a circular base or pan 21 having a flange 23 forming a cavity or recess 25 for removably supporting a transparent circular member 27 in its recess. In use, a map 29 of the area to be traversed may be located in the recess 25 between the circular base 21 and the underside of the transparent member 27 when member 27 is in inserted in place in the recess 25. The member 27 has a notch 27A formed in its periphery at the 0° or 360° position. The flange 23 has an inward projection 23A formed therein which is adapted to fit within the notch 27A when the member 27 is inserted in the recess 25. The notch 27A and projection 23A thus prevent the members 27 and 21 from rotating with respect to each other. When a map 29 is to be employed, it also will have a notch 29A formed in its periphery corresponding with notch 27A and at a position representative of a given orientation, i.e. true north on the map. Thus, when the members 27 and 21 are assembled together with a map therebetween, the two members 27 and 21 and the map will be held fixed with respect to each other and the map 29 and the degree chart face of the member 27 will be in the proper relationship, with respect to each other. When the disc, comprising members 27 and 21, with a map inserted therebetween, is located in the recess of the base plate 13, it may be rotated by turning the top surface of the member 27.

When the disc is located in the recess 15, the top surface of the transparent member 27 will be flush with the top surface of the circular wall portions 17A. A transparent sliding member 33' having parallel straight edges 33A and 33B is removably supported for sliding movement above the recess 15 and hence above the disc and holds the disc 20 in place in the recess. Slots 35 and 37 are formed in edge members 39 and 41 on opposite sides of the recess for supporting the member 33' for sliding movement above and across the disc in a direction perpendicular to the length of the straight edges 33A and 33B. As illustrated, the edge members 39 and 41 and hence the slots 35 and 37 are shorter than those of the embodiment of FIGS. 1–4. The upward extensions 17B of wall 17 act as stops for preventing the sliding member 33' from sliding off of the base plate. The sliding member 33' is flexible and can be removed by bending its center outward to allow the disc 20 to be removed and a new map inserted between the member 27 and the pan 21. Slidably coupled to the member 33' is a transparent guide 63 having straight edges 63A and 63B which are employed as marking guides. Formed along the length of the edges 63A and 63B are equally spaced marks 65 representative of distance. The sliding member 33' has an elongated central aperture 33C formed therethrough. In addition, the guide 63 has two apertures 63C and 63D formed therethrough in which are inserted rivet-like members 71 and 73 for holding the members 63 to sliding member 33' but allowing the member 63 to slide along the length of member 33'.

Attached to the end of the base plate 13 to which the edge member 41 is formed, is a flexible cord 75 to allow the device to be carried around one's neck. Formed in the opposite end of base plate 13 are two slots 77 and 79 forming two hook-like portions 81 and 83 respectively. Also provided is a spring biased clip 85 having a ring shaped portion 87. In use, when the device is hung from one's neck by cord 75, the ring 87 may be inserted in one of the slots 77 or 79 around one of the hook-like portions 81 or 83 and the clip will be attached to one's clothing. This, in effect, secures the bottom end of the device to one's clothing and prevents the device from swinging while walking. In use, only one clip 85 will be employed. The clip on the left of FIG. 7 merely illustrates the clip 85 when detached from the device 11.

Member 27 is formed of a material such as milar or other suitable material whereby its top surface may be marked or written upon, for example, with pencil or certain types of ink. The marks may be erased when desired. In addition to the degree marks 31 formed around the periphery of the member 27, a quadrant degree scale illustrated at 89 may be formed inside marks 31 and which may be useful for mappers or surveyors to facilitate calculators of acreage, tracts, etc. With this arrangement shown, the degrees of scale 31 may be converted directly to quadrant degrees. The base member 13 also has a reference mark 45 formed on its front face. In addition, a travel direction mark 91 is formed on the back face of the base member 13 and which is in alignment with mark 45. Attached to the back of the base member 13 is a compass 43. The device of the embodiment of FIGS. 5–9 is operated in the same manner as that of the embodiment of FIGS. 1–4 for charting direction, distance and for navigation purposes. In the embodiment of FIGS. 5–9, however, the compass is adjustably secured to the back side of the base member 13 to allow magnetic declination to be corrected whereby navigation may be carried out with respect to true north.

Figure 9:
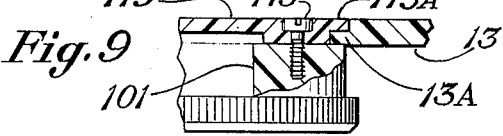
FIG. 9 is a cross sectional view of a center portion of the base plate of FIG. 6 illustrating the manner in which the magnetic compass is adjustably secured to the back side of the base plate.
Figure 6:
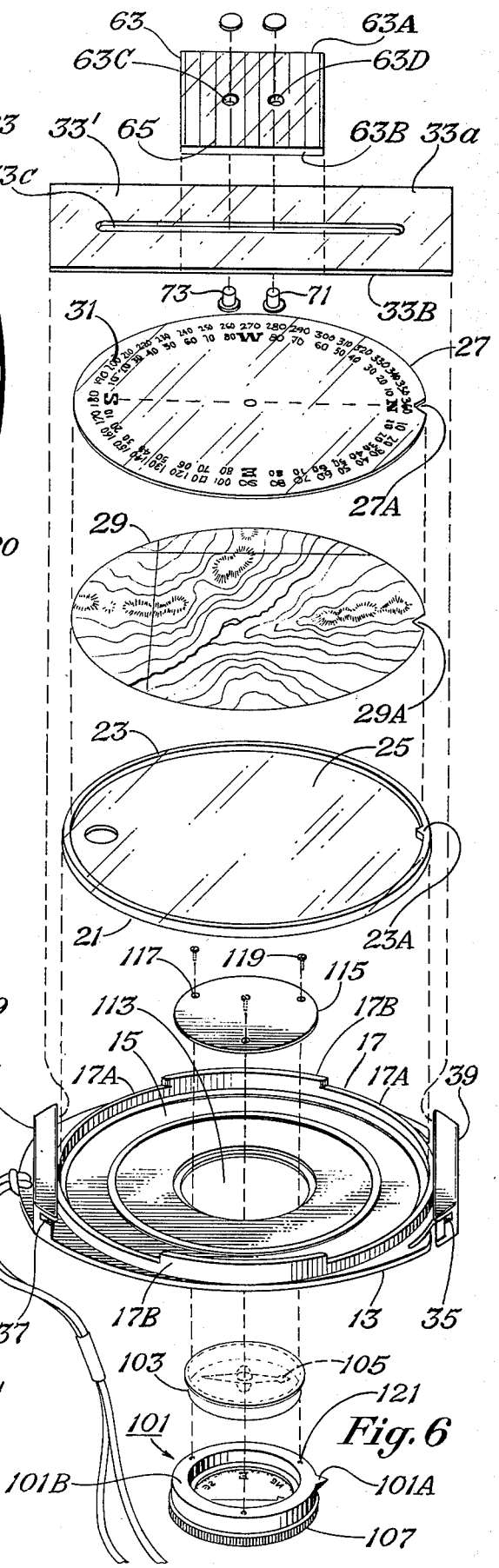
FIG. 6 is an exploded view of the device of FIG. 5.

The compass 43 comprises an annular base member 101 which supports a transparent case 103 carrying a rotatable magnetic needle 105. A pointer 101A is formed on one side of the base 101 at its flat edge or end 101B. Rotatably secured to the other edge of the base 101 is a transparent face plate 107 having degree marks 109 formed thereon, as well as an arrow 111. The base plate 13 of device 11 has a central aperture 113 formed therethrough with an inward extending stepped edge 13A as illustrated in FIG. 9. Also provided is a central plate 115 having an outward extending stepped edge 115A which is adapted to mate with and fit on the inward extending edge 13A of the plate 13. Three apertures 117 are formed through the plate 115 for receiving bolts 119. The bolts are threaded into apertures 121 formed in the edge 101B of the base member 101. As illustrated in FIG. 9, the base member 101 of the compass, when secured in place, fits against the back side of the plate 115 and against the back side of the base member 13 whereby the plate 115, the base plate 13 of the device 11 and the base 101 of the compass are fixedly secured together by the bolts 119. The base 101 of the compass may be rotated to different positions by loosening the bolts 119 and securing the base 101 in different angular positions relative to the base plate 13.

Formed on the back side of the base plate 13, on opposite sides of the travel direction mark 91, are degree marks 123 representative of magnetic declination from true north. Magnetic declination may be corrected for by loosening the bolts 119 and rotating the base member 101 until the pointer 101A points opposite the magnetic declination in the area in which the device is to be used. For example, in Fort Worth, Tex., the magnetic declination is about 9° east. The base 101 of the compass 43 will be positioned whereby the pointer 101A points to 9° east from 0° on the degree scale 123. The bolts 119 then will be secured in place so that the base 101 of the compass will be fixedly secured to correct for the 9° magnetic declination. In use, direction then will be determined with respect to true north. For example, if one wants to travel true north, in using the compass, one will rotate the face plate 107 to a position until arrow 111 is in alignment with arrow 101A which is pointing to the 9° east declination mark. One then will rotate the complete device 11 until the north end of the needle 105 is in alignment with the arrow 111. In traveling, one will travel in the direction in which the direction arrow 91 points which will be in the direction of true north. The charting operations on the opposite side will be carried out in the manner similar to that described previously. In this respect, the disc 20 will be rotated until 0° is in alignment with the reference mark 45 and the path charted by drawing a line with the aid of members 33' and 63 for a distance representative of the distance traveled.

As now can be understood, the embodiments of FIGS. 1–9 provide many features which are unique and which facilitate navigation and charting of one's path of travel. In this respect, the sliding member 33 or 33' locks the disc 20 in place but allows it to be rotated freely; since it is flexible, it provides a quick means for removing the disc for allowing one to change to different maps; since it is transparent, it provides an unobstructive view of the map surface; and provides a guide to allow one to chart an infinite number of paths but still remain in perfect relationship to the degree heading selected on the degree scale 31. The unique combination of the rotatable disc 20 and the sliding member 33 or 33' allows one to draw from any selected point on the map surface as many as 360 degree lines, each being at the proper degree with respect to the point selected, whether the selected point is located at the center of the disc or one side thereof. The indexing arrangement comprising the notch 27A and the projection 23A of the member 27 and 23 insures that when a map is located between members 27 and 23, it will remain fixed in the proper relationship to the degree chart face of member 27. In the embodiment of FIGS. 5–9, the use of the quadrant degrees allow a direct conversion from the 360° chart to quadrant degrees. In addition, in this latter embodiment, the arrangement for adjustably securing the compass to the base plate 13 along with the magnetic declination scale 123 provides a quick positive arrangement for correcting for magnetic declination. The slots 77 and 79 and hook portions 81 and 83, along with the spring clip 85 provides a quick disconnect means to allow the device to be pulled to the side and fastened to prevent swinging.

Figure 10:
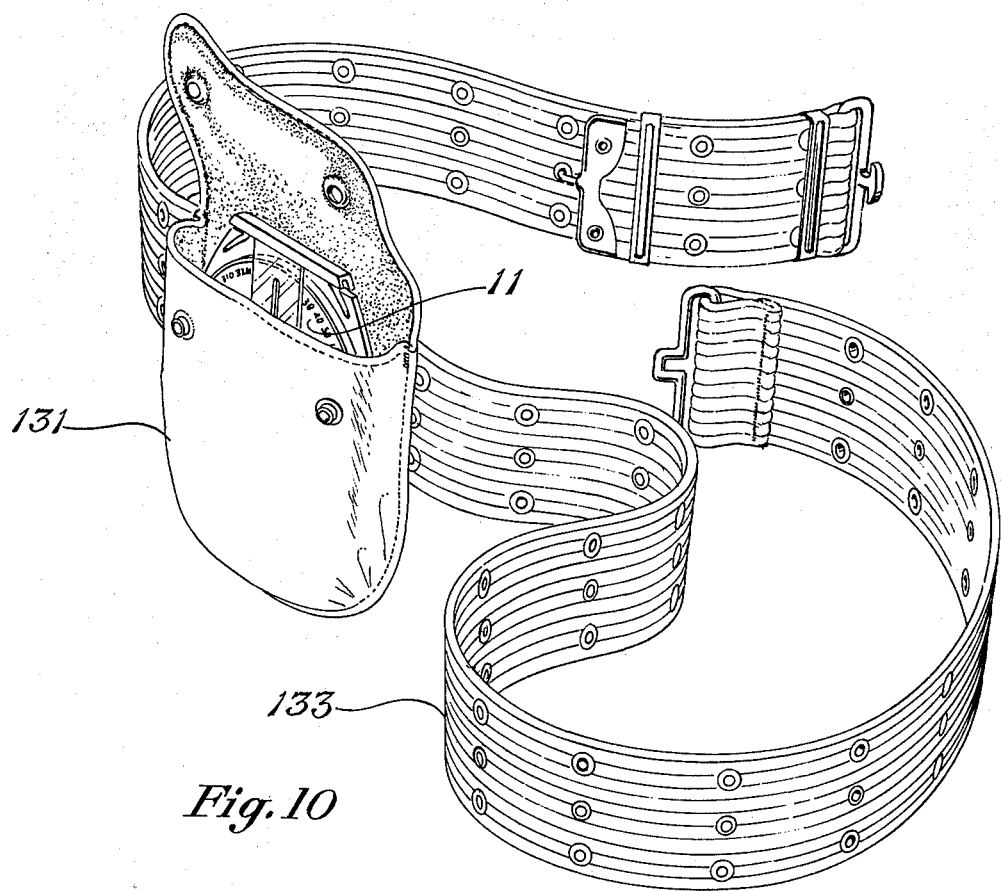
FIG. 10 illustrates a pouch secured to a belt for carrying the device of the present invention.

As one example, the device 11 of the embodiments of FIGS. 1–9 may have dimensions of about 6 × 7 inches and a thickness, not including the compass of about ⅞ of an inch. In the embodiments of FIGS. 5–9, the stops 17B are formed as an upward extension of the wall 17, however, it is to be understood that stops could be secured to the base plate at a position outside of the wall 17. Although the embodiments of FIGS. 5–9 disclose a cord for allowing one to carry the device 11 around one's neck, it is to be understood that the device could be carried in a pouch 131 secured to a belt 133 to be worn by the user, as illustrated in FIG. 10.

In the preferred embodiment, the disc 20 is formed from members 21 and 27 to allow a map to be readily inserted and held in place in proper degree orientation between these members. It is to be understood, however, that the disc 20 may be formed only from member 27, modified to fit in recess 15 for rotation therein. In this embodiment, the map, when used, may be properly attached, i.e. by tape or glue, to the bottom of member 27. In the modification wherein the disc is formed from a single member 27, the member 27 may be secured for rotation to the base plate 13 (in the embodiment of FIGS. 1–4) by way of a pin or flat headed bolt extending through the center of the member 27 and through the base plate 13. In this embodiment, the circular ridge 17 will not be needed. In addition, the map will be attached directly to the top of the member 27 within the circle of the degree marks 31.

Although a map preferably will be used with the device, it is to be understood that the device may be used without a map, i.e., as a navigational instrument or as a mapping device. It is to be understood that the device also may be used for position location or range finding, i.e., for military purposes.

We claim:
1. A navigational, charting, or calculating device comprising:
   base plate means,
   disc means comprising a transparent circular member having an upper surface adapted to be marked upon, and a circular base having a recess therein adapted to receive a map and said transparent circular member for holding and securing a map between said transparent circular member and said circular base.
   said base plate means having a circular cavity in its top side for removably receiving said disc means for rotation therein,
   said base plate means having a reference mark formed on said top side,
   said transparent circular member having its peripheral edge divided into increments of interest for alignment with said reference mark upon rotation of said disc means,
   sliding means having a straight edge marking guide, and means on said base plate means for supporting said sliding means above said disc means for sliding movement across said disc means in a direction perpendicular to the length of said straight edge.
2. The device of claim 1 wherein:
   said sliding means comprises:
      a first member having two parallel straight edges,
      a second member supported by said first member to slide along said parallel straight edges of said first member and having a straight edge parallel to said two parallel straight edges with equally spaced marks along its length representative of distance,
   said base plate means has two spaced parallel guide means located on opposite sides of said disc means for supporting said first member for sliding movement across said disc means in a direction perpendicular to its parallel straight edges.
3. The device of claim 2 comprising:
   stop means formed on said base plate means for preventing said sliding means from sliding off of said base plate means.
4. The device of claim 1 comprising:
   two spaced parallel slots means facing each other and formed on the top side of said base plate means and on opposite sides of said circular cavity for receiving opposite ends of said sliding means for supporting said sliding means for movement across the top of said disc means and for allowing said sliding means to hold said disc means in said circular cavity,
   stop means formed on said base plate means for preventing said sliding means from sliding off of said base plate means,
   said sliding means comprising a flexible member adapted to be flexed for allowing said sliding means to be removed from and inserted into said parallel slot means.
5. The device of claim 1 comprising:
   a travel direction mark on the back side of said base plate means in alignment with said reference mark,
   degree marks representative of magnetic declination from true north formed on the back side of said base plate means on opposite sides of said travel direction mark,
   a magnetic compass comprising:
      a base having a first end and a second end,
      a reference point formed on said base,
      a magnetic needle rotatably supported by said base, and
      a transparent plate with degree marks rotatably secured to the second end of said base, and
   means for adjustably securing said base of said magnetic compass to the back side of said base plate means to allow said reference point of said base to be located opposite one of said degree marks representative of magnetic declination in the area in which said device is to be used.
6. A navigational, charting, or calculating device comprising:
   base plate means,
   disc means comprising a transparent circular member having an upper surface adapted to be marked upon and a circular base adapted to support said transparent circular member for holding and securing a map between said transparent circular member and said circular base, said circular base of said disc means having an extending flange around its edge forming a circular cavity for removably receiving a circular map or the like and said transparent circular member, said base plate means having a circular cavity in its top side for removably receiving said disc means for rotation therein, said base plate means having a reference mark formed on said top side, said disc means having its peripheral edge divided into increments of interest for alignment with said reference mark upon rotation of said disc means, sliding means having a straight edge marking guide, and means on said base plate means for supporting said sliding means above said disc means for sliding movement across said disc means in a direction perpendicular to the length of said straight edge.

7. The device of claim 6 comprising:
a notch formed in the periphery of said transparent circular member of said disc means, and
an inward projection formed on the inside surface of said flange adapted to fit into said notch and into a similar notch formed in the periphery of a circular map or the like for holding said transparent circular member, a map or the like, and said circular base, fixed with respect to each other when said transparent circular member, and said flat circular base are assembled together with a map or the like located there between.

8. A navigational, charting, or calculating device comprising:
base plate means,
disc means comprising a transparent circular member having an upper surface adapted to be marked upon and a circular base adapted to support said transparent circular member for holding and securing a map between said transparent circular member and said circular base,
said circular base of said disc means having an extending flange around its edge forming a circular cavity for removably receiving a circular map or the like and said transparent circular member,
said base plate means having a circular cavity in its top side for removably receiving said disc means for rotation therein,
said base plate means having a reference mark formed on said top side,
said disc means having its peripheral edge divided into increments of interest for alignment with said reference mark upon rotation of said disc means,
sliding means having a straight edge marking guide supported above said disc means for sliding movement across said disc means in a direction perpendicular to the length of said straight edge,
two spaced parallel slots means facing each other and formed on the top side of said base plate means and on opposite sides of said circular cavity for receiving opposite ends of said sliding means for supporting said sliding means for movement across the top of said disc means and for allowing said sliding means to hold said disc means in said circular cavity, and
stop means formed on said base plate means for preventing said sliding means from sliding off of said base plate means,
said sliding means comprising a flexible member adapted to be flexed for allowing said sliding means to be removed from and inserted into said parallel slot means.

9. The device of claim 8 comprising:
a notch formed in the periphery of said transparent circular member of said disc means, and
an inward projection formed on the inside surface of said flange adapted to fit into said notch and into a similar notch formed in the periphery of a circular map or the like for holding said transparent circular member, a map or the like, and said circular base, fixed with respect to each other when said transparent circular member, and said flat circular base are assembled together with a map or the like located therebetween.

10. The device of claim 8 comprising:
a travel direction mark on the back side of said base plate means in alignment with said reference mark,
degree marks representative of magnetic declination from true north formed on the back side of said base plate means on opposite sides of said travel direction mark,
a magnetic compass comprising:
a base having a first end and a second end,
a reference point formed on said base,
a magnetic needle rotatably supported by said base, and
a transparent plate with degree marks rotatably secured to the second end of said base, and
means for adjustably securing said base of said magnetic compass to the back side of said base plate means to allow said reference point of said base to be located opposite one of said degree marks representative of magnetic declination in the area in which said device is to be used.

* * * * *